United States Patent

[11] 3,584,151

[72] Inventor Kenneth L. Kielar
Norridge, Ill.
[21] Appl. No 734,328
[22] Filed June 4, 1968
[45] Patented June 8, 1971
[73] Assignee Motorola, Inc.
Franklin Park, Ill.

[54] REMOTE CONTROL SYSTEM PROVIDING CALLS WITH DIFFERENT PRIORITY AND SCANNING OF REMOTE STATIONS
16 Claims, 7 Drawing Figs.

[52] U.S. Cl. .......... 179/1, 179/37
[51] Int. Cl. .......... H04m 9/06
[50] Field of Search .......... 179/1.4, 37—40

[56] References Cited

UNITED STATES PATENTS

| | | | |
|---|---|---|---|
| 2,740,842 | 4/1956 | Schneider et al. ............ | 179/37 |
| 3,304,376 | 2/1967 | Truly ............ | 179/1 |

*Primary Examiner*—Kathleen H. Claffy
*Assistant Examiner*—Jan S. Black
*Attorney*—Mueller & Aichele

ABSTRACT: Remote control system with central console having selector for making connections to any one of a plurality of remote stations, and controls for setting the priority of the remote stations and reminder action thereat. A counter is provided for scanning the remote stations and stopping at a station from which a call is originated, and for indicating at the central console the stations which are set for predetermined operations. The central console indicates the station making a call and the priority thereof and the indication can be transferred to a remote station.

Inventor
KENNETH L. KIELAR
BY Mueller, Aichele & Rauner
ATTYS.

Inventor
KENNETH L. KIELAR
BY Mueller, Aichele & Rauner
ATTYS.

Inventor
KENNETH L. KIELAR
BY Mueller, Aichele & Rauner
ATTYS.

Inventor
KENNETH L. KIELAR
BY Mueller, Aichele & Rauner
ATTYS.

REMOTE CONTROL SYSTEM PROVIDING CALLS WITH DIFFERENT PRIORITY AND SCANNING OF REMOTE STATIONS

BACKGROUND OF THE INVENTION

Remote control systems are used in many applications such as in hospitals to indicate at a central console the number of a room from which a call has been placed, and to permit communication between the nurse and the patient. Systems have been provided wherein priority is assigned to the various patient stations so that calls from patients which may require attention promptly are given priority with respect to calls from other stations. These systems have been objectionable in that they have required the setting of a control at the patient station to provide the priority operation, and because the nurse could not check to see which stations have been set for priority operation without going to the patient station.

The nurse call systems which have been provided have not had facilities for storing information which could remind a nurse that some attention was required at a patient station when she was free to do this. This has made it necessary for the nurse to make notes of such reminders which requires time and the notes may be misplaced. Further, there has been a problem that the nurse must leave the control console and cannot then receive calls. Although radio systems have been provided wherein the nurse carries a paging receiver, this adds to the equipment and increases the cost of the system.

SUMMARY OF THE INVENTION

It is an object of this invention to provide an improved nurse call system wherein the nurse can set up the system for the desired operation at the central console.

Another object of the invention is to provide a nurse call system wherein priority can be afforded to particular patient stations by a control action at the central console, and the numbers of remote stations so set can be read out at the central console.

A further object of the invention is to provide a nurse control system wherein each patient station has a memory element and the system has facilities for scanning the memory elements to determine if attention is needed at the various patient stations.

Still another object of the invention is to provide a nurse control system which permits transfer of indications of the calls to a room in which the nurse may be working so that she can receive calls when she is not at the control console.

In practicing the invention, a nurse control system is provided having a control console and a counter for providing signals to a plurality of patient stations to select a particular station. The console has a pushbutton-operated selector providing potentials to the counter to directly select a station and clock pulses can be applied to the counter to cause the same to connect the stations in turn. The console has facilities for providing settings at the patient stations to accord a station priority for calls made, or to store reminder information at the station that further attention is required. A central control circuit includes a clock for providing the pulses to the counter for scanning the stations and portions to start and stop the clock. A slow clock operates when the scanning stops to produce a time interval during which the number of the station selected is displayed. The system can scan all the stations and read out the stations set for priority or reminder operation.

When a call is placed from a remote station the clock causes the counter to scan the stations until the station originating the call is reached, at which time the clock is stopped and the number of the station is indicated. The signals from the patient stations are at different voltage levels to indicate routine or priority operations and to indicate calls from special emergency stations, and this provides different indications at the central console. A nurse follower circuit makes it possible for the indications of calls to be made at a selected patient station.

BRIEF DESCRIPTION OF THE DRAWINGS

In the drawing, FIG. 1 shows the console 40 for the nurse control system which is provided at a desk at the nurse control station. FIG. 2 shows a section of the hospital with the nurse station and a plurality of patient rooms of different types, operating and delivery rooms, equipment rooms, etc. This shows the connection from the nurse control station through the central control unit 41 to the various stations in the rooms. It will be pointed out that in the rooms in addition to the stations 42 at the patient's bedsides, there are emergency stations 43 in the washrooms. There are staff stations 44 as well as emergency stations 43 in the operating room, recovery room, delivery room, and staff stations and duty stations 45 in the rooms where the nurses may be working, such as for medical preparation, or records. The dome lights 47 above the doors are also shown in FIG. 2.

Figure 1:
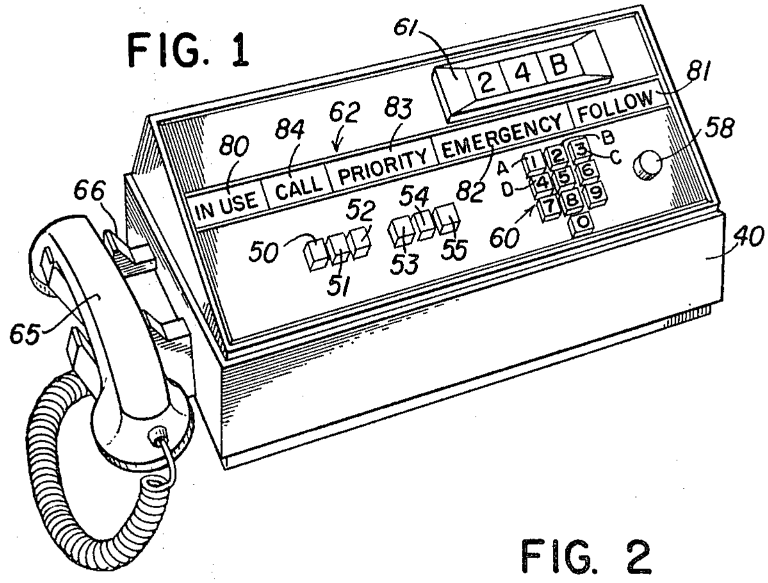
FIG. 1 is a perspective view of the nurse control console of the system of the invention.
Figure 2:
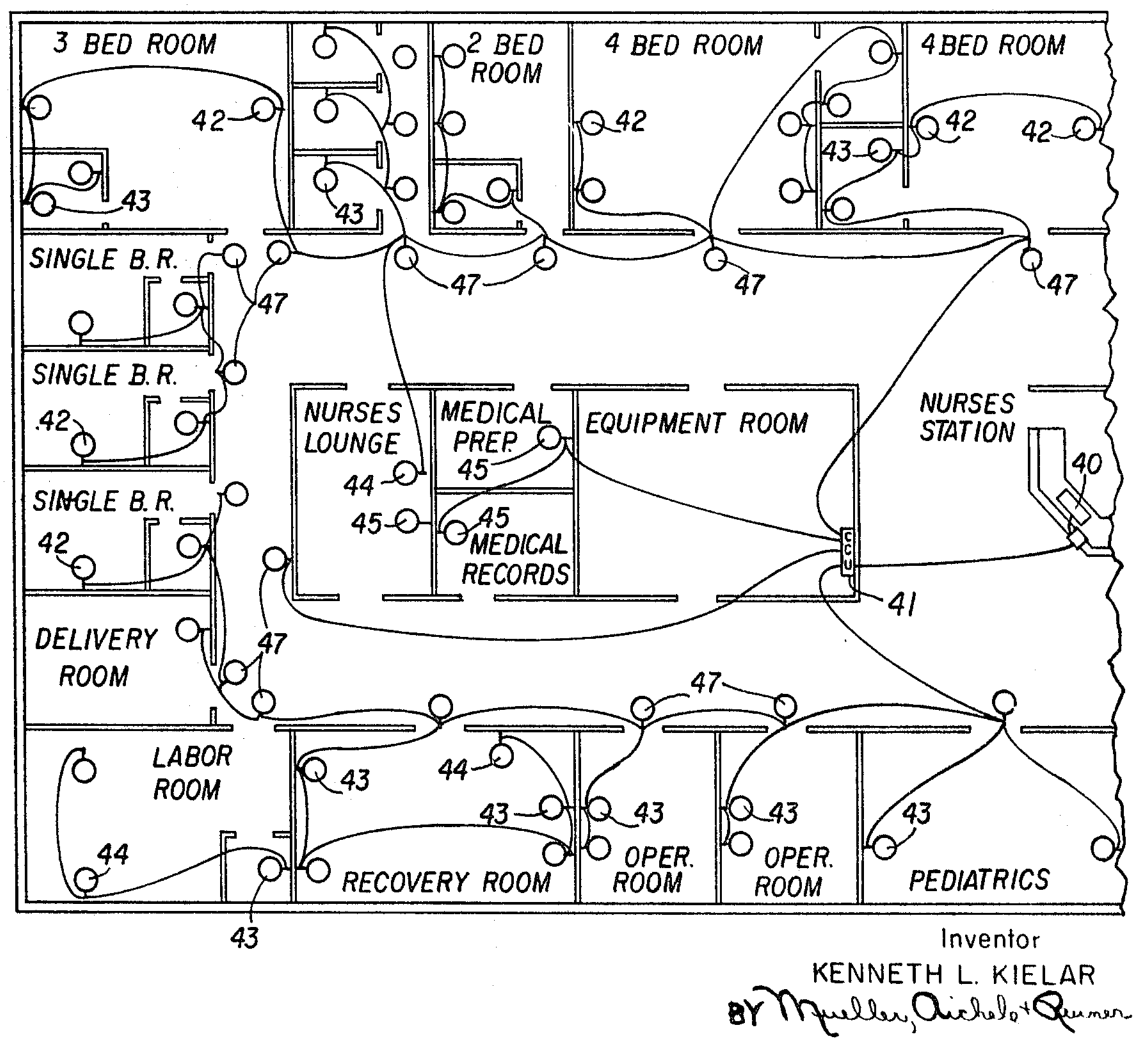
FIG. 2 illustrates the use of the nurse control system in a hospital.

The nurse control console 40 (FIG. 1) includes pushbuttons 50 to 55 which control different operations of the nurse control system. Control 58 adjusts the volume of the sound reproduced in the receiver of the handset, and also operates a switch to preempt any operation which may be taking place. The set of 10 pushbuttons 60 is used to select the number of the room with which some operation is to take place. In the system illustrated, two number digits will be provided for the room number, followed by a letter (alpha) digit to indicate the bed within the room. The control console has an indicator panel 61 with three spaces providing a digital display of the room number of the station which is calling, or which has been selected. In the drawing the digital display for station No. 24B is shown.

An illuminated announce panel 62 is provided across the front of the control console which selectively lights up various sections which show the types of operation taking place. A handset 65 is provided on a cradle 66 at the left side of the console. A switch is provided in the cradle to operate a circuit when the handset is removed from the cradle.

Figure 3:
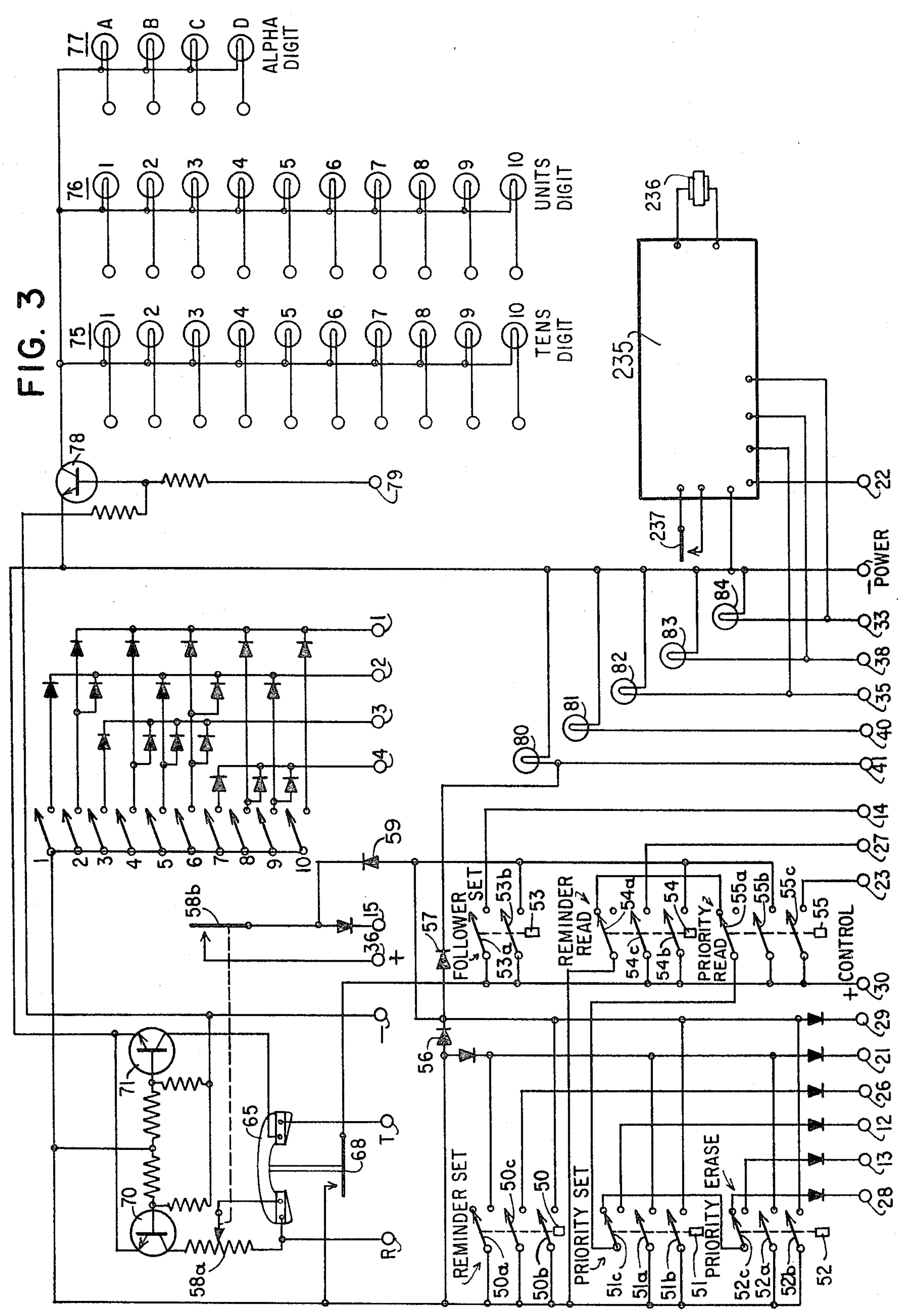
FIG. 3 is a circuit diagram of the nurse control console.

FIG. 3 shows the circuit of the equipment within the console. Labels are applied to the switches 50 to 55 to indicate the functions thereof. When the handset 65 is removed, the switch 68 closes to apply the positive control potential from terminal 30 to the contacts of the pushbutton switches 60. These switches are connected to a binary matrix to selectively apply the positive potential to the four terminals 1, 2, 3 and 4. When pushbutton No. 1 (A) is operated, potential is applied only to terminal 2; when button No. 2 (B) is operated, potentials are applied to terminals 1 and 2; and when button No. 3 (C) is operated, potential is applied to terminal 3 only. In the system described, three-digit numbers are used, and to select a station the buttons 60 representing the numbers are operated in turn. This is a known digital to binary matrix.

Operation of switch 68 by removal of the handset 65 also applies the positive potential to the base electrodes of transistors 70 and 71. This overcomes the negative bias potential applied to the base electrodes so that the transistors 70 and 71 effectively connect the receiver and transmitter of the handset in the audio circuit. The receiver and transmitter are connected to the audio circuit by the terminals R and T, respectively. The receiver is connected through potentiometer 58*a* which is operated by the control 58 on the panel.

The potential applied through the hook switch 68 is also applied through diodes 56 and 57 to the In Use lamp 80 to energize the same. This potential is also applied through diodes 56 and 59 to the reset terminal 15 to reset the counter each time an operation is initiated.

The nurse control system of the invention classifies calls as emergency, priority and routine. The emergency calls all originate at emergency stations. However, priority and routine calls originate from the same patient stations and the system permits the nurse to set the stations for priority operation from the console without going to the station itself. This will be described with reference to FIGS. 1 and 3. To set priority, the handset is removed and the station involved is selected by use of pushbuttons 60. Then the Priority Set button 50 is operated. Contacts **51*a* and 51*b* operated by button 50 apply the positive control potential from terminal 30 to output terminals 21 and 29 of the control console. The potential at terminal 21 operates to stop the clock which operates the counter to select stations, and the potential at terminal 29 provides lockout of any other nurse control console. These operations will be described. Contact 51*c* applies a potential which is conducted over a path through the Reminder Read switch 54 and the Priority Read switch 55 to the output terminal 12**. This will cause a control at the station selected to be set for priority operation.

To erase priority, Priority Erase button 52 is operated. This operates switch contacts **52*a* and 52*b* to apply the positive control potential from terminal 30 to the terminals 21 and 29, as when setting priority. Operation of switch contact 52*c* applies the positive control potential, which is again completed through the Reminder Read and Priority Read switches, and through the Priority Set switch, to the output terminal 13**. This operates the control associated with the selected station to remove the priority connection, so that calls from this station will come in as routine calls.

Operation of the Priority Read button 55 initiates a scanning action so that the station numbers of all the stations set for priority operation appear in turn on the indicator 61 of the console. Operation of the button 55 will cause operation of switch contacts **55*a*, 55*b* and 55*c* coupled thereto. Contact 55*a* will open the circuit to the Priority Set and Priority Erase switches 51*c* and 52*c* so that these are rendered ineffective. Switch 55*b* applies the positive control potential to the terminal 15 to reset the counter, as will be explained. Switch 55*c* applies the positive control potential to output terminal 23 which causes operation of the central control for the system so that all of the stations are selected in turn and those which are set for priority operation will be indicated in turn on the station indicator 61 of the control console. To read priority, it is not necessary to remove the handset as the positive control potential from terminal 30 is applied directly to switch contact 55*c* and this connection does not extend through the cradle switch 68**.

In order to register in the system information that a special service is required at a particular station, the Reminder Set Button 50 can be operated. As for Priority Set and Erase, the handset is first removed, and the station involved is selected by pushbuttons 60. Reminder Set button can then be operated to actuate switch contacts **50*a*, 50*b* and 50*c*. Contacts 50*a* and 50*b* provide the positive control potential from terminal 30 to the output terminals 21 and 29, as previously described. Contact 50*c* applies the positive potential from terminal 30 to terminal 26**, which is connected to the selector circuit for a particular station, as will be described.

The stations set for reminder operation can be read in generally the same way that the stations set for priority are read. The Reminder Read button 54 operates switches **54*a*, 54*b* and 54*c*. Switch 54*a* breaks the connection to the Priority Set and Priority Erase switches 51*c* and 52*c*, as previously mentioned. Contact 54*b* applies the positive control potential to the reset terminal 15 to reset the counter. Contact 54*c* connects the positive control potential from terminal 30 to output terminal 27, which is connected to the central control for the system. This operation does not require removal of the handset since contact 54*c*** is directly connected to the positive control potential terminal.

The Follower Set button provides operation so that the nurse can receive calls at any patient station. Operation of the button 53 closes switch **53*a* which applies the positive control potential to output terminal 14 which is connected to the central control. Switch 53*b* applies the control potential to the reset terminal 15**.

The preempt switch **58*b* which is operated by the control 58 (FIG. 1) applies a positive potential from terminal 36 to the reset terminal 15** for preempt action.

As stated in connection with FIG. 1 the nurse control console has a digital display panel 61 which shows the number of the station with which the operation is taking place. The lights for this digital display are shown in FIG. 3, with the lights providing the tens digit of the number being indicated at 75, the lights for the units digit being indicated at 76, and the lights for the alpha or letter digit being indicated at 77. Ten lights are provided for the tens and units digits and four lights for the alpha digit. This is on the basis that there will not normally be more than four beds in a room. Additional alpha digits can be provided if required. The lamps for the digital display are energized through transistor 78 which is rendered conducting when a positive potential is applied at terminal 79. This terminal is connected to the central control and the energization thereof will be explained.

The lights in the announce panel 62 in the console of FIG. 1 are also shown in FIG. 3. These are lights 80 indicating In Use, 81 for Follow, 82 for Emergency, 83 for Priority, and 84 for Call. These lights are connected to the input terminals 41, 40, 35, 38 and 33 on the control panel, and are directly connected to the negative power supply so that application of a positive potential to the associated input terminal directly energizes the lights. As previously stated, the In Use light 80 is connected to the positive control terminal 30 through the hook switch 68 so it is lit whenever the hook switch is removed, if the control potential is applied at terminal 30. This light can also be energized by a potential at terminal 41 which may be connected to an additional control console in the system so that use of the system by operation of the other console will be indicated.

Figure 4:
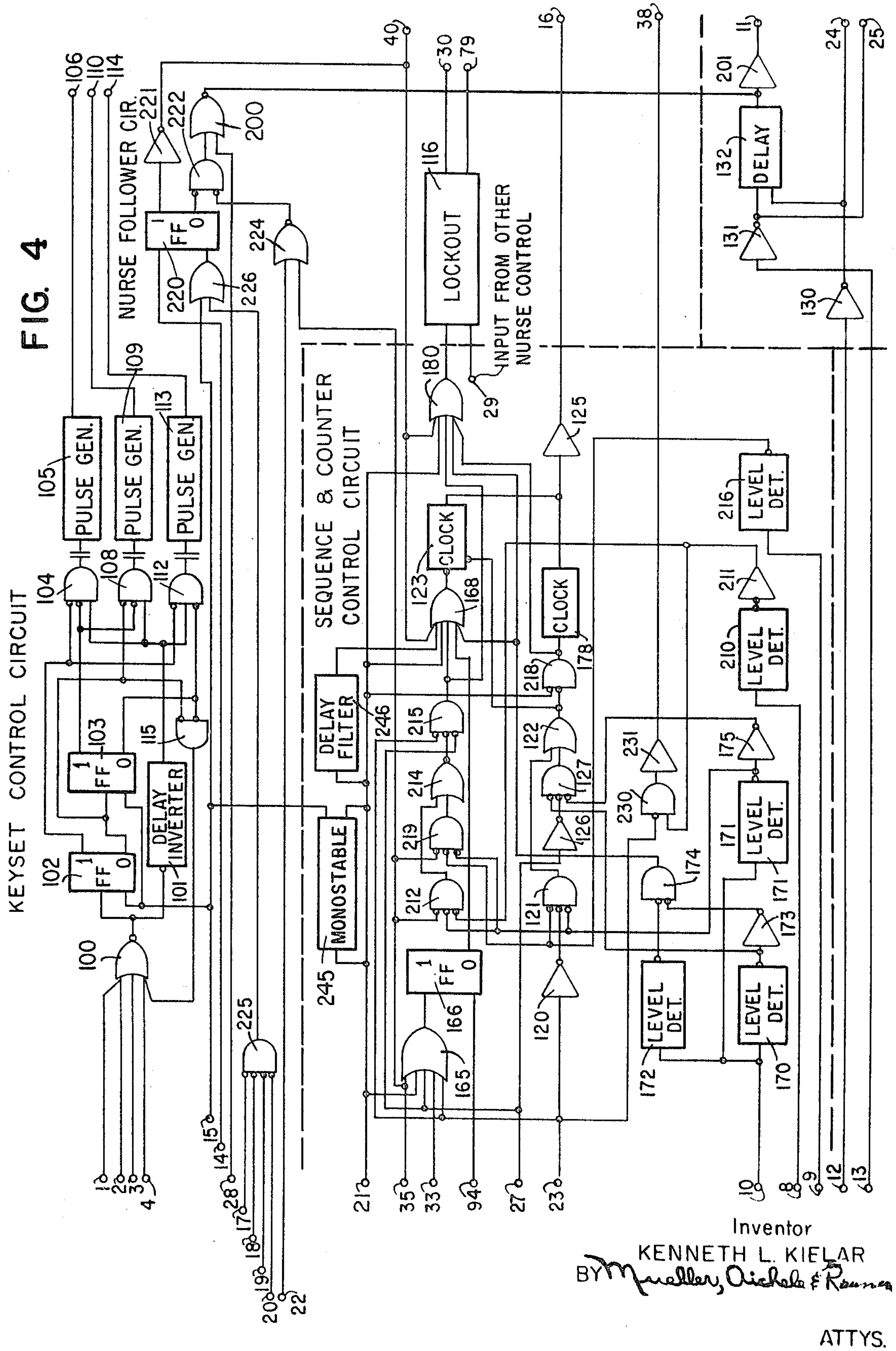
FIG. 4 is a block diagram of the central control system.

The central control logic for the nurse control system is illustrated in FIG. 4. Connections from the circuit of FIG. 3 for the console to the circuit of FIG. 4 for the central control are shown by the use of the same numbers on the terminals for the two units. Similarly connections between any two units shown in different figures of the drawing are apparent as the same numbers are given to the terminals of the units which are interconnected.

The digital inputs from output terminals 1, 2, 3 and 4 of the nurse control console (FIG. 3) are connected to terminals 1, 2, 3 and 4 of the central control (FIG. 4) and are applied to the OR gate 100. A voltage on one or more of the digital lines will cause an output from the OR gate 100 to the delay inverter 101 and to the flip-flop 102. In the initial condition, the flip-flops 102 and 103 are reset. The output of gate 100 resulting from the digital voltage for the tens digit will turn off the inverter 101 and apply a pulse to the NAND gate 104. This will actuate the pulse generator 105 which is connected to the tens enable terminal 106 to provide an enabling pulse. When the pushbutton for the tens digit (selector 60) is released at the console, the flip-flop 102 will reverse and the positive voltage from AND gate 100 for the units digit will cause the NAND gate 108 to actuate the pulse generator 109 to provide a units enable voltage at output terminal 110. When the voltage from the pushbutton for the units digit (selector 60) terminates, the flip-flop 103 will reverse, and the voltages through the AND gate 100 for the alpha digit will cause the NAND gate 112 to actuate the pulse generator 113 to provide an alpha enable voltage at the output terminal 114. At the end of the third pulse the NAND gate 115 acts to disable the input OR gate 100 until the system is reset.

When the Priority Set switch of the console is operated, a potential is applied to output terminal 12 thereof which is connected to terminal 12 of the central control. This potential is coupled through inverter 130 to the output terminal 24 of the central control circuit. The Priority Erase switch applies a potential from terminal 13 of the console to the input terminal 13 of the central control and through inverter 131 to the Priority Erase output terminal 25. Both Priority Set and Priority Erase potentials are applied through the delay filter 132 and inverter 201 to the output terminal 11.

As previously stated, when the Priority Read or Reminder Read pushbutton is operated, the system scans all of the stations and indicates which stations are set for priority or reminder action. This action takes place by the sequence and counter control circuit in FIG. 4. For Priority Read operation a positive potential is applied from terminal 23 of the console to terminal 23 in the control circuit of FIG. 4. This potential is applied through OR gate 165 to set flip-flop 166 and remove the positive potential from NOR gate 168 to start the clock 123. The output of the clock 123 is applied to the amplifying OR gate 125 which provides the clock output at terminal 16. The clock 123 provides output pulses at a fast rate, such as 5,000 Hz.

The Reminder Read signal applied from terminal 27 of the console to terminal 27 at the central control of FIG. 4 also applies a positive potential through OR gate 165 to set flip-flop 166. This removes the positive potential from NOR gate 168 to start the clock 123. This output is again applied through the amplifying OR gate 125 to the output terminal 16.

The signal at terminal 29 of the control console is applied to terminal 29 of the central control to provide lockout action. This makes it possible to use a plurality of nurse control consoles in the same system, and operation of any one will prevent operation of another. The lockout circuit 116 in FIG. 4 is operated by the lockout input 29 from another nurse console and by the OR gate 180 (to be described) to control the potential at the positive control terminal 30 and at the terminal 79 for actuating the transistor 78. When one console has initiated an operation, the lockout removes the positive control potential 30 from any other console in the same system.

Figure 5:
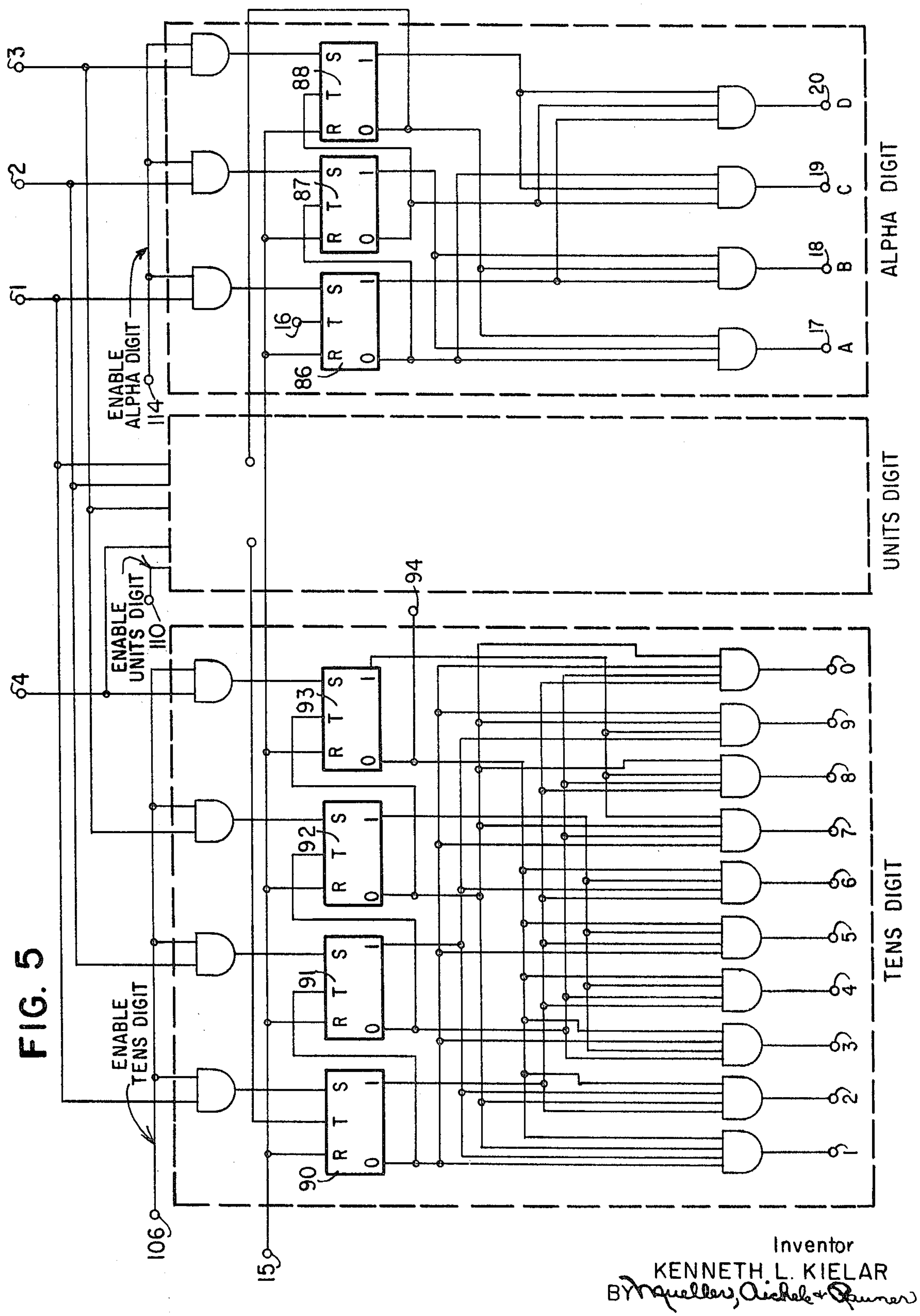
FIG. 5 is a block diagram of the counter and decoder circuit.

FIG. 5 shows the decoder and counter used in the control system. The four binary outputs 1, 2, 3 and 4 of the nurse control console provide the binary information representing each digit which is applied to the four inputs 1, 2, 3 and 4 of the decoder. As stated in connection with FIG. 4, when the voltages for the first digit are applied, an enable output is produced at output terminal 106. This is applied to input terminal 106 in FIG. 5 to enable the tens digit counter. This will provide a tens digit output at the terminals along the bottom of the tens digit counter.

When the voltage for the units digit is applied to the binary inputs, a voltage will be produced at the output 110 in FIG. 4 which will be applied to the input terminal 110 in FIG. 5 to enable the units digit counter. This counter is shown only by block diagram as it will be the same as the tens digit counter. Each of these counters can be of standard construction and a detailed description is not given. The third voltage at the binary inputs will provide a voltage at output terminal 114 in FIG. 4, and this is applied to the input terminal 114 of FIG. 5 to enable the alpha digit counter. This is shown with four outputs for the letters A, B, C and D, but as was previously stated the alpha counter can have a different number of outputs.

Clock pulses from terminal 16 of the central control are applied to the clock input of the counter to cause the counter to scan in sequence through all the station numbers. This is used in various operations of the system as will be explained. The clock pulses are applied from terminal 16 to the first flip-flop 86 for the alpha digit, and through the other flip-flops 87 and 88 for the alpha digit to the units digit counter which is shown only as a block. The connection extends from the units digit counter to the tens digit counter and through the flip-flops 90 to 93 thereof. A connection 94 is made to the last flip-flop of the tens digit counter to provide a potential to reset the flip-flop 166 at the central control to stop the clock 123.

The counter is reset by the voltage at the terminal 15, which is applied thereto from the console, as has been described. This results from operation of the hook switch at the console, or operation of the preempt switch 58*b*, or operation of one of the buttons 50 to 55. This potential is applied to reset all of the flip-flops of the counter.

The connections from the outputs of the counters are applied to the lamps 75, 76 and 77 shown on the circuit of FIG. 3, which provide the indication for the tens, units and alpha digits of the station. This circuit is completed through the transistor 78 which is energized by a potential at terminal 79. The counter outputs are also connected to the station selectors to render the circuit of such selector operative, as will be described.

Figures 6, 7:
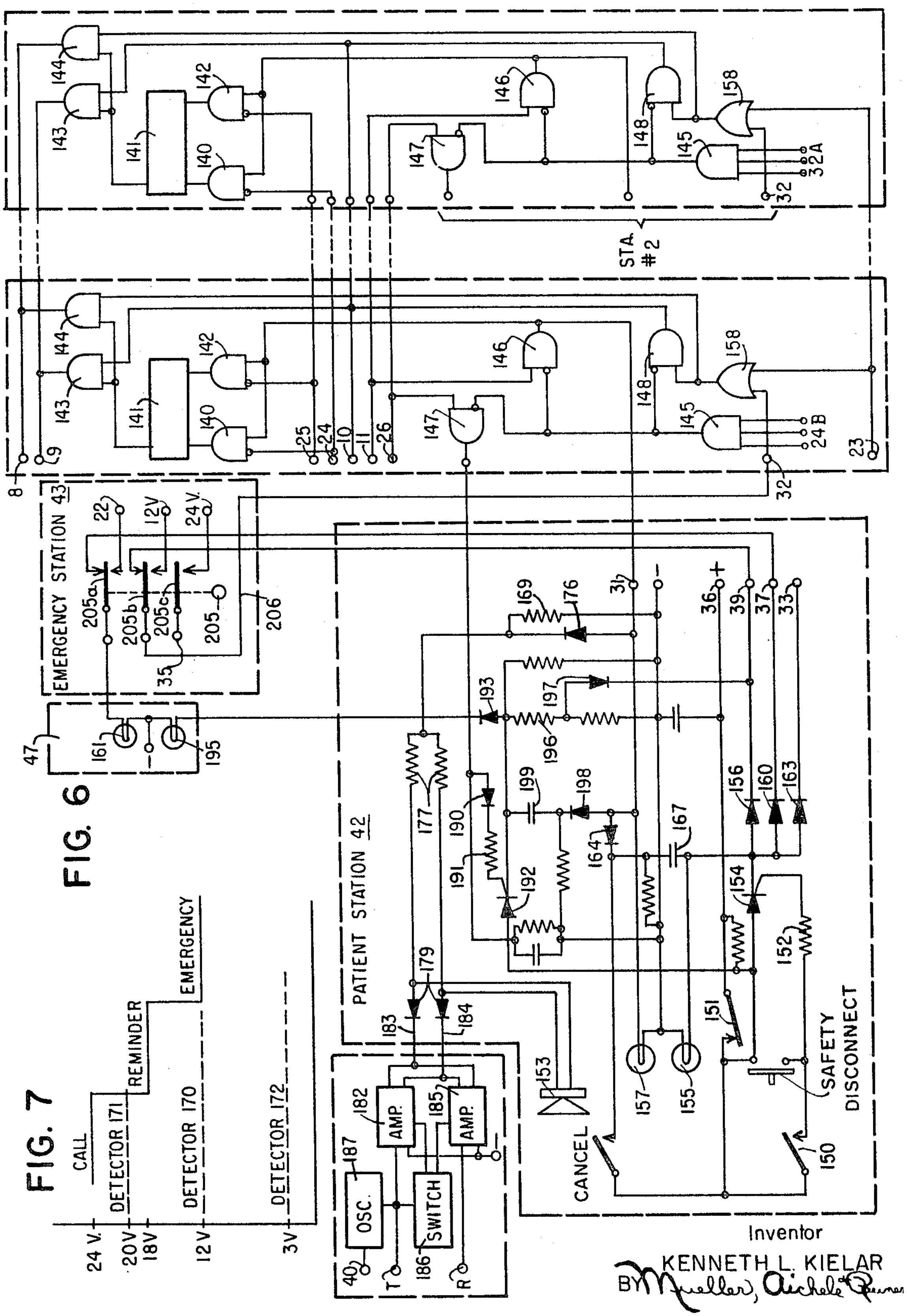
FIG. 6 is a block diagram of the station selector circuits and a schematic circuit diagram of a patient station and an emergency station.
FIG. 7 indicates the voltage level applied from the remote stations for various different operations.

FIG. 6 shows a station selector circuit which is representative of the station selector circuits provided for all the stations. A patient station, such as shown by the box 42 in FIG. 6, and an emergency station, as shown by the box 43, may be coupled to each station selector circuit. Other stations such as staff stations and duty stations may also be connected to the selector circuits.

The counter outputs (FIG. 5) are selectively connected to the inputs of the AND gate 145 in the station selector circuits (FIG. 6) so that outputs corresponding to a particular number will select each station. In FIG. 6 the three inputs for the station selector at the right side of the diagram are connected to outputs 3, 2 and A of the tens, units and alpha counters, designating the station 32A. The inputs for the second selector which is to the left of the first selector are connected to outputs 2, 4 and B of the counters. This is the number shown on the indicator 61 in FIG. 1.

Considering a call placed at the patient station shown in FIG. 6 which is not set for priority operation (routine call), the patient operates the switch 150 to apply a positive potential from terminal 36 through switch 151 and resistor 152 to the control electrode of silicon controlled rectifier 154. The silicon controlled rectifier 154 conducts through lamp 155 and applies the potential from terminal 36 through diode 160 to output terminal 37 which is connected through normally closed contact 205*a* of emergency station 43 to the dome light 161. This is positioned at the door to the room so that any nurse on the floor can see that a call has been placed from this station.

The potential from silicon controlled rectifier 154 is also applied through diode 163 to the terminal 33 which is connected to terminal 33 in the central control of FIG. 4. This is one of the inputs to OR gate 165 which sets the flip-flop 166 to remove the positive potential from the NOR gate 168 so that it starts the clock 123. This will cause the counter to scan until the station selected is reached. At this point the AND gate 145 at the station selector (FIG. 6) will operate to enable AND gates 146, 147 and 148.

The potential from the silicon controlled rectifier 154 when a call is placed is also applied through diode 156 and through the normally closed contacts 205*b* of the emergency station 43 to terminal 32 connected to the OR gate 158. This causes the OR gate 158 to apply a potential to the AND gate 148 which then applies voltage to the terminal 10 in the station selector. This is connected to terminal 10 of the sequence and counter control circuit (FIG. 4) which is in turn connected to the level detectors 170, 171 and 172.

For calls initiated at a patient station, and when the emergency station is not actuated, a potential of 24 volts will be applied to the terminal 10. This potential is applied to level detector 171 which has a threshold of 20 volts. The level detector 171 produces a negative output in response to the 24-volt input, which is applied to NAND gate 212. The other inputs to the NAND gate 212 are also negative so that this has a positive output which is applied to NOR gate 214. This gate applies a negative potential to NAND gate 215 so that it in turn applies a positive potential to gate 168 to stop the clock 123 at the station initiating the call. The number of the station calling will then appear on the indicator 61 at the nurse control station. The potential from terminal 33 of the patient station is also applied to terminal 33 at the console and will energize the call light 84.

When the nurse picks up the handset 65 at the console to answer the call, the hook switch 68 is closed so that a potential is applied through the normally closed switch contacts 54*a*, 55*a*, 51*c* and 52*c* to terminal 28. Terminal 28 is connected to the corresponding input terminal 28 on the central control of FIG. 4. This potential is applied through the OR gate 200 and the inverter 201 to terminal 11, which is connected to terminal 11 on the station selector circuit of FIG. 6. This potential is applied to the AND gate 146, which is enabled as AND gate 145 is operated when the station is selected. Gate 146 applies a potential to terminal 31 of the patient station to energize answer light 157. This potential is also applied through diode 164 to capacitor 167 connected to the cathode of silicon-controlled rectifier 154 to reduce the current therethrough so that it cuts off and opens the call circuit.

A call placed at a patient station can also be cancelled at that station by opening the cancel switch 151, which removes the potential from the silicon-controlled rectifier 154.

The answer voltage on line 31 is also applied through diode 176 and through resistors 177 to render diodes 179 conducting to connect the speaker-microphone 153 to the audio circuit. The diodes are normally rendered nonconducting by the negative voltage applied through resistor 169, and the positive voltage from conductor 31 overrides this voltage. The audio lines are connected to the audio circuit of the system which is also illustrated in FIG. 6. The terminals T and R are connected to the correspondingly marked terminals in the nurse control console (FIG. 3). The patient will see that the answer light 157 is lit and will know that he can talk to the nurse.

The audio signals from the transmitter at the nurse console are applied through amplifier 182 to the lines 183 and 184, and through the diodes 179 for reproduction by the speaker-microphone at the patient station. The lines 183 and 184 will be connected to all the patient stations in the system, and also other stations such as staff stations. Audio signals from the patient station applied through diodes 179 to lines 183 and 184 will be amplified by amplifier 185 and applied to terminal R for reproduction at the nurse control console. The amplifier 185 is normally operative, and a voice-operated switch 186 turns off this amplifier and turns on amplifier 182 in response to audio signals at the input of amplifier 182. An oscillator 187 is rendered operative to apply a tone to amplifier 182 when it is actuated by a potential applied to terminal 40, as will be explained.

Considering the action at the selector circuit (FIG. 6) for Priority Set and Erase operations, the potential applied to terminal 11 for Priority Set operation is applied to AND gate 146. When the station has been selected by the application of the proper inputs to the AND gate 145, AND gate 146 is enabled so that the potential is applied to AND gate 140. The input from terminal 24 will apply a second input to the AND gate 140 so that flip-flop 141 will be set to the priority condition. When the flip-flop 141 is in the priority condition it provides an input to the AND gates 143 and 144 to provide priority operations, as will be explained.

When the Priority Erase button is operated, potentials are applied to terminals 11 and 25 and this will cause AND gate 146 to enable AND gate 142 in the event the station has been selected. The potential from terminal 25 through AND gate 142 will cause the flip-flop 141 to return to the nonpriority or routine condition.

When a call is placed at a patient station set for priority operation, the potential at terminal 33 acts to start the clock in the same way as for a routine call. The potential from terminal 32 which is applied through OR gate 158, is now applied through the enabled AND gate 144 to terminal 8. Also, the potential from AND gate 148 is applied through the enabled AND gate 143 to terminal 9. These terminals are connected to the corresponding terminals in the central control of FIG. 4.

The potential at terminal 8 is applied to level detector 210 which provides a negative potential to inverter 211 which in turn applies a positive potential to NAND gate 212. This produces a positive output at gate 212 and does not act to stop the clock. However, the potential at terminal 9 causes level detector 216 to have a negative output which is applied to NAND gate 219 so that all inputs thereto are negative. NAND gate 219 has a positive output which is applied to NOR gate 214, and this applies a negative potential to NOR gate 168 to stop the clock 123 at the station initiating the call.

The output of inverter 211 and the input from terminal 23 which is energized for Priority Read operation are connected to AND gate 230. This gate provides a positive output in response to the positive potential from inverter 211 when there is no input from terminal 23. This positive output is amplified by amplifier 231 and applied to terminal 38 which is connected through terminal 38 at the console to energize the PRIORITY light 83.

To set the reminder in a patient station, the handset 65 at the console is removed from the hook, the station selected by operation of pushbuttons 60, and the Reminder Set button 50 is then operated. This applies a potential to output terminal 26 in FIG. 3 which is connected to input terminal 26 in FIG. 6. This applies a potential to one input of AND gate 147, the other input of which is energized when the particular station is selected by operation of AND gate 145. The output of AND gate 147 is connected to the patient station 42, being applied through diode 190 and resistor 191 to the control electrode of silicon-controlled rectifier 192. This causes the rectifier 192 to conduct through diode 193 to energize reminder lamp 195 in the dome light 47. This may be a green light to distinguish it from the call light. The conduction of silicon-controlled rectifier 192 also provides current through resistor 196 and diode 197 to terminal 39, which as previously stated is connected through closed contacts 205*b* in the emergency station 43 and through conductor 206 to the OR gate 158. This voltage is reduced by action of resistor 196 and is applied through gate 148 to conductor 10.

When a call is answered at the console, the positive voltage from terminal 28 applied through the central control and the station selector provides a potential at terminal 31 of the patient station, as has been described. This is applied through diode 198 and capacitor 199 to the cathode of the silicon controlled rectifier 192 which provides reminder action, to cut off this rectifier and cancel the Reminder Set in that station.

As previously stated, emergency stations 43 are located in a washroom or other area where a call may be placed which must be taken care of immediately. The emergency stations are connected through the same station selector as the patient stations, and in general there is an emergency station for each patient station. The emergency station 43 (FIG. 6) has a single switch 205 which may be a pull cord operated switch. The contact 205*c* applies a positive potential to terminal 35, which is applied to the input terminals 35 at the console (FIG. 3) and at the central control (FIG. 4). The potential at terminal 35 at the console actuates the annunciator and causes an intermittent potential at terminal 22. Contact 205*a* connects terminal 22 to the dome light 161 so that the light 161 flashes to attract the attention of anyone in the hall that an emergency condition exists.

The potential at terminal 35 of the central control is applied through OR gate 165 to set flip-flop 166, which removes the positive potential from NOR gate 168 so that it acts to start the clock 123 and causes the counter to scan.

Contact 205*b* of the emergency station 43 (FIG. 6) applies a 12-volt potential to conductor 206 which is connected to terminal 32. As previously stated, this terminal is connected to an input of the OR gate 158 and the potential is applied through this gate to AND gate 148. When the particular station is reached, the AND gate 145 operates to enable AND gate 148 so that the 12-volt potential is applied to terminal 10. This is a lower potential than that provided when the contact 205*b* is in its upper or released position for applying a potential from the patient station 42 to terminal 32.

The potential at terminal 10 of the central control (FIG. 4) will provide a positive output from level detector 170 which is inverted by inverter 173 to provide a negative input to NAND gate 174. The potential at terminal 10 also provides a negative output from level detector 172 to the second input NAND gate 174, so that this gate provides a positive potential to NOR gate 168 to stop the clock. The station number will then appear on the indicator 61 at the nurse control station, and the potential at terminal 35 will energize the EMERGENCY light 82. A call placed at an emergency station can be cancelled only by resetting the switch 205 at the emergency station.

For Priority Read operation, the Priority Read switch 55 at the console (FIG. 3) is operated to provide a potential at terminal 23, as previously stated. This is applied as an input at terminal 23 of the central control (FIG. 4) and passes through OR gate 165 to set flip-flop 166. This removes the positive potential from NOR gate 168 which starts the fast clock 123. The clock 123 will operate to cause the counter to scan through each of the stations in turn. The potential at terminal 23 of the console is also applied to the station selector at terminal 23. This is applied through OR gate 158 to AND gate 144 to apply the potential to terminal 8. When each station is selected by operation of the gate 145 thereat, this will apply a signal to AND gate 148, and since a signal is also applied thereto from terminal 23 through OR gate 158, the AND gate 148 will provide a potential to terminal 10 and to AND gate 143. If the particular station is set for priority operation, the AND gate 143 will be enabled and will provide an output at terminal 9.

The potentials applied at the terminals 8, 9 and 10 of the station selector (FIG. 6) will be applied to the corresponding terminals of the central control (FIG. 4). The potential at terminal 9 is applied to level detector 216 which produces a negative output for inputs above 20 volts, and since the signal applied is of the order of 24 volts, a negative signal is applied to NAND gate 121. The potential on line 10 causes the level detector 171 to apply a second negative potential to gate 121, and the input from terminal 23 which is inverted by inverter 120 forms the third negative input potential thereto. The gate 121 therefore applies a positive potential to NOR gate 122 so that it has a negative output which is applied to clock 123 to stop the same. The negative output from gate 122 is also applied to NAND gate 218 to provide a positive output therefrom to start clock 178.

The voltage at terminal 8 during Priority Read produces a negative output from level detector 210 which is inverted by inverter 211 to apply a positive potential to AND gate 231. However, the input to gate 230 from terminal 23 is also positive so that the gate 230 does not provide an output to terminal 38 and the PRIORITY light is not energized during Priority Read operation.

Therefore, for Priority Read operation an output is applied to terminal 23 to start the clock 123 and cause the counter to scan the stations, and each station set for priority operation in turn produces an output at terminals 8, 9 and 10. This stops the fast clock 123 and operates the slow clock 178 so that the counter stops for a period of 3 seconds at each station set for priority. This is sufficient time for the station number to be indicated and observed by the nurse. When the 3-second period of clock 178 terminates, it applies a pulse to cause the counter to step to the next station. If this station is set for priority, fast clock 123 will be held stopped and slow clock 178 will continue so that the number of the next station is indicated. If the next station is not set for priority, there will be no potentials on lines 8 and 9 and the fast clock 123 will start again for fast scanning of the stations.

For Reminder Read operation, the Reminder Read button 54 is operated to apply a potential to terminal 27 at the console. This is applied to terminal 27 at the central control (FIG. 4) which operates through OR gate 165 to set the flip-flop 166. This removes the positive potential from NOR gate 168 to start the clock 123. At each patient station set for reminder operation, a reduced voltage (18 v.) is applied to OR gate 158 of the station selector, as previously stated. When each station is selected by the scanning operation of the counter, the AND gate 145 thereat is operated to enable AND gate 148 so that the voltage from OR gate 158 passes therethrough. This applies the reduced voltage output to terminal 10 and it is applied at the central control to the level detectors 170 and 171. The output of level detector 170 is negative as the input is above 12 volts, and this forms one input for NAND gate 127. The positive output of level detector 171 is inverted by inverter 175 for the second input to NAND gate 127. The potential at terminal 27 which is inverted by inverter 126 forms the third negative input to gate 127 so that it provides a positive output. This potential is applied to NOR gate 122 so that it has a negative output which is applied to clock 123 to stop the same. The negative output of gate 122 is also applied to NAND gate 218 so that it has a positive output to start the 3-second clock 178. The counter therefore stops for a 3-second interval so that the number of the station selected will be indicated on the digital display panel 61 at the console.

After the 3-second interval, the slow clock 178 will produce a pulse to cause the counter to step to the next station. If this is set for reminder, the voltage at terminal 10 will cause the slow clock to continue so that the number of the next station is indicated. If the next station is not set for reminder, the fast clock will start again and the counter will scan until a station set for reminder is reached.

The lockout circuit 116 controls the application of the positive control potential to terminal 30 and also the potential at terminal 79 which controls the digital display lights. This circuit is operated by a potential at terminal 29 from the console, and also by a potential applied by the NOR gate 180. The NOR gate 180 has a plurality of inputs and acts to prevent energization of the station indicator lights when the counter is operated by clock 123 at high speed. The clock may have a frequency of 5,000 c.p.s. and it is not desired to attempt to operate the lights when scanning through the various stations. When the clock 123 is stopped and the clock 178 is operated, the lights are energized to indicate the station selected. The clock 178 operates once every 3 seconds, which is sufficient time for the station number to be observed so that the nurse can note the stations being read out. This is the same for Priority Read and Reminder Read operations.

FIG. 7 illustrates the various potentials which are applied at terminal 32 of the station selector, and which are applied through OR gate 158 and AND gate 148 to terminal 10. This potential is in turn applied to the input terminal 10 in the central control of FIG. 4, and to the inputs of level detectors 170, 171 and 172. For a routine or priority call, the potential applied from the patient station is 24 volts. When the reminder signal is applied to a patient station the voltage applied to terminal 32 is dropped by resistor 196 in FIG. 6 to a voltage of the order of 18 volts. When the emergency switch is operated, the voltage is 12 volts for a further stepdown.

FIG. 7 also shows the levels at which the detectors 170, 171 and 172 operate. Level detectors 210 and 216 respond to potentials applied at terminals 8 and 9 when a priority call is made or read out. These level detectors both operate at a threshold of 20 volts, with level detector 210 producing a positive output at input voltages over 20 volts (which excludes the reminder and emergency voltages), and level detector 216 producing a positive output for all voltages below 20 volts.

When an incoming routine call is received, the potential from the duty terminal 33 at the patient station is applied to terminal 33 at the nurse control console to light the CALL lamp 84. If the call is from a station given priority status, the voltage at terminal 38 of the central control is applied to the input terminal 38 on the console to light the PRIORITY lamp 83. For an emergency call, the output from terminal 35 of the emergency station is applied to terminal 35 at the console to light EMERGENCY lamp 82.

The central console (FIG. 3) includes an annunciator 235 which applies signals to a sounder 236 which may be a piezoelectric device. A switch 237 connected to the annunciator can be operated to change the level of signals applied to the sounder to thereby change the sound output. The annunciator provides a tone every 6 seconds when a potential is applied at terminal 33 for a routine call, provides a tone once per second when a potential is applied at terminal 38 for a priority call, and produces a continuous tone when an input is applied at terminal 35 for an emergency call. The unit 235 also provides an intermittent potential in accordance with the call received, which is one pulse per second for a priority call, and one pulse for each 6 seconds for a routine call. These pulses are applied to terminal 22 and are applied therefrom to the central control for use in connection with the nurse follower action.

For nurse follower operation, the handset must first be lifted, and then the station number selected. The Follower Set button 53 is then pressed to close contact 53a and provide a positive potential at output terminal 14. This is applied to input terminal 14 in the central control of FIG. 4 to set the flip-flop 220. This will provide a SET output to amplifier 221 which provides a positive potential at terminal 40, which is connected to terminal 40 of the console (FIG. 3) to energize the follower light 81. This output also goes to NOR gate 168 to hold the clock stopped.

The negative voltage at the second output of the flip-flop 220 is applied to NAND gate 222. Terminal 22 which receives an intermittent potential when either a routine or a priority call is received, and terminal 35 which receives a potential during emergency calls are connected to NOR gate 224. A positive input from either terminal will provide a negative output which is applied to the second input of NAND gate 222. NAND gate 222 therefore has a positive output when the Follower Set button is operated and there is a call from a remote station which is either routine, priority or emergency. This output is applied to NOR gate 200 which produces a negative output which is inverted by inverter 201 to provide a positive potential at terminal 11. If the call is answered at the console, a potential is applied from terminal 28 to NOR gate 200 to cut off the negative output.

As the AND gate 145 of the station selector (FIG. 6) is operated at the selected station, this enables the AND gate 146 so that the potential terminal 11 when a call comes in (applied from FIG. 4 to FIG. 6) will be applied through the station selector to terminal 31 at the patient station. This lights the answer light 157 and biases the diodes 179 into conduction to complete the audio circuit. The potential provided by the central control at terminal 40 during the follower operation, causes the oscillator 187 of the audio circuit to start to apply a tone through amplifier 182 to lines 183 and 184. This tone will be reproduced at the selected station so that it can be heard by the nurse when she is at this station. The potentials applied to gate 224 will cause the tone to be continuous for an emergency call, to sound once per second for a priority call, and once every 6 seconds for a routine call.

When the station number is selected during nurse Follower Set, the voltage for the alpha digit is applied from terminal 17, 18, 19 or 20 of the counter through the same numbered terminal in the central control (FIG. 4) to the OR gate 225. This applies a negative voltage to OR gate 226 so that this gate does not reset the flip-flop 220. The flip-flop 220 will be reset by the manual reset potential applied to terminal 15.

As previously stated, the potential applied to terminal 21 of the central control acts to stop the counter when various operations take place. A monostable circuit 245 is connected to the line 21 to provide a continuous potential thereon in the event that the potential is intermittent because of contact bounce. A delay filter 246 is also connected between line 21 and the NOR gate 168 so that the stop potential is applied to the gate for a time after the potential is removed from terminal 21.

The system of the invention has been found to be highly effective to provide signalling of the nurses and communication between the nurses and the patients. The nurse has full facilities available at the console for setting up priority stations and to store reminder information. Calls coming in can be transferred to follow the nurse at a station where she will be working. The number of the stations and the type of operation is indicated at the console so that the nurse is continuously and fully informed.

I claim:

1. In a remote control system including a central console having a plurality of controls thereon, and a plurality of remote stations interconnected to the console by electrical conductors, the combination including, a control circuit associated with each remote station, digital counter means having a plurality of outputs providing signals associated with a plurality of numbers, means selectively connecting said outputs to said control circuits of the remote stations whereby each station is associated with a particular number, said counter means being operative to selectively energize said outputs to enable said control circuits in turn, selector means at the console connected to said counter means and having means for setting the number of a particular remote station, said selector means being operable to automatically stop said counter means at the number set to thereby activate said control circuit for a particular remote station, and control means at the console for causing predetermined operations at said control circuit associated with a selected remote station.

2. The system of claim 1 including indicator means at the console connected to said counter means for indicating the station selected by said counter means.

3. The system of claim 1 wherein said control circuits provide a plurality of modes of operation and said control means is operative to cause a selected control circuit to operate in a particular mode.

4. The system of claim 3 including indicator means at the console connected to said control means for indicating the mode of operation of the selected one of said control circuits.

5. The system of claim 1 including audio means at the console and at each remote station, and a single audio channel interconnecting said audio means for providing audio communication therebetween.

6. The system of claim 5 wherein each control circuit includes means for establishing an operative connection between said audio means at the associated remote station and said audio means at the console.

7. The system of claim 1 wherein said selector means includes pushbutton controls at the console for operating the same.

8. The combination of claim 2 wherein said counter means produces signals representing the digits of a number associated with a particular remote station and said indicator means produces a visual indication of the digits of such number.

9. The system of claim 1 wherein said control circuit for each remote station has call means for operating said control circuit to initiate operation of said counter means, and circuit means cooperating with said call means to apply a signal to said central control for a priority call from such station, and said central control causes said console to indicate the presence of a priority call.

10. The system of claim 1 wherein each remote station has switch means connected to the control circuit for providing emergency calls and said console has means connected to said control circuits of said remote stations for indicating the presence of an emergency call.

11. A nurse call system including in combination, a console having a plurality of controls thereon, a central control connected to said console, and a plurality of remote stations connected to said console and to said central control by electrical conductors, said central control including counter means having outputs selectively connected to said remote stations and operative to enable said stations in turn, said console including selector means connected to said counter means for causing the same to select a particular remote station, and control means for causing predetermined operations at a selected remote station, said control means including switch means cooperating with means at said remote stations for setting the same for a predetermined type of operation, and for causing said counter means to operate to scan all of said remote stations and to stop at stations which are set for such predetermined operation.

12. A system of claim 11 wherein said switch means acts to set control means at said remote stations for priority operation, and said console includes means for indicating the numbers of the stations set for priority operation when said counter means is stopped at such stations.

13. The system of claim 11 wherein said switch means is operative to set control means at said remote stations for reminder operation, and said console includes means for indicating the numbers of the stations set for reminder operation when said counter means is stopped at such stations.

14. A nurse call system including in combination, a console having a plurality of controls thereon, a central control connected to said console, a plurality of remote patient stations, a plurality of control circuits individually associated with said remote patient stations and connected to said console and said central control by electrical conductors, said central control including counter means having outputs selectively connected to said control circuits and operative to enable said remote stations in turn, said console including selector means connected to said counter means and having a setting for each remote station for stopping said counter means to thereby select a particular remote station, said central control including a first fast clock and a second slow clock, and means for controlling said clocks whereby said fast clock applies pulses to said counter means for operating the same to scan said remote stations rapidly and said slow clock applies pulses to said counter means for operating the same to hold a station selected for a predetermined time interval, said control circuits associated with said remote stations applying signals to said central control for stopping said fast clock and starting said slow clock.

15. A nurse call system including in combination, a console having a plurality of controls thereon, a central control connected to said console, a plurality of remote patient stations, a plurality of control circuits individually associated with said remote patient stations and connected to said console and said central control by electrical conductors, said central control including counter means having outputs selectively connected to said control circuits and operative to enable said remote stations in turn, said console including selector means connected to said counter means and having a setting for each remote station for stopping said counter means to thereby select a particular remote station, each remote patient station having call means for operating the associated control circuit to initiate operation of said counter means to enable said stations in turn, said control circuit operating in response to the outputs from said counter means to stop said counter means at each station having said call means thereof operated, said console including switch means for causing said central control to automatically apply signals received thereby to a remote station selected by said selector means to indicate the presence of a call from another remote station.

16. The system of claim 15 further including means for applying a tone signal to the selected remote station, with the tone signal being interrupted to indicate the priority of the call.